(12) United States Patent
Natanzon et al.

(10) Patent No.: US 10,235,145 B1
(45) Date of Patent: Mar. 19, 2019

(54) DISTRIBUTED SCALE-OUT REPLICATION

(75) Inventors: Assaf Natanzon, Tel Aviv (IL); Lev Ayzenberg, Petach Tikvah (IL)

(73) Assignee: EMC International Company, Hamilton (BM)

( * ) Notice: Subject to any disclaimer, the term of this patent is extended or adjusted under 35 U.S.C. 154(b) by 1488 days.

(21) Appl. No.: 13/614,260

(22) Filed: Sep. 13, 2012

(51) Int. Cl.
| | | |
|---|---|---|
| G06F 11/14 | (2006.01) |
| G06F 11/20 | (2006.01) |
| G06F 17/30 | (2006.01) |
| G06F 3/06 | (2006.01) |
| G06F 3/12 | (2006.01) |
| G06F 8/41 | (2018.01) |
| G06F 12/00 | (2006.01) |

(52) U.S. Cl.
CPC .............. *G06F 8/451* (2013.01); *G06F 3/065* (2013.01); *G06F 3/067* (2013.01); *G06F 3/0617* (2013.01); *G06F 11/2064* (2013.01); *G06F 3/0665* (2013.01); *G06F 3/1218* (2013.01); *G06F 11/1446* (2013.01); *G06F 11/1464* (2013.01); *G06F 11/1471* (2013.01); *G06F 11/2074* (2013.01); *G06F 11/2082* (2013.01); *G06F 17/30575* (2013.01); *G06F 2201/84* (2013.01); *G06F 2201/855* (2013.01)

(58) Field of Classification Search
USPC ........................................................ 711/165
See application file for complete search history.

(56) References Cited

U.S. PATENT DOCUMENTS

| | | | |
|---|---|---|---|
| 5,170,480 A | 12/1992 | Mohan et al. |
| 5,249,053 A | 9/1993 | Jain |
| 5,388,254 A | 2/1995 | Betz et al. |
| 5,499,367 A | 3/1996 | Bamford et al. |
| 5,526,397 A | 6/1996 | Lohman |
| 5,864,837 A | 1/1999 | Maimone |
| (Continued) |

FOREIGN PATENT DOCUMENTS

| | | |
|---|---|---|
| EP | 1154356 | 11/2001 |
| WO | WO 00 45581 A3 | 8/2000 |

OTHER PUBLICATIONS

Gibson, "Five Point Plan Lies at the Heart of Compression Technology;" Apr. 29, 1991; 1 Page.

(Continued)

*Primary Examiner* — Reginald G Bragdon
*Assistant Examiner* — Marwan Ayash
(74) *Attorney, Agent, or Firm* — Daly, Crowley, Mofford & Durkee, LLP

(57) ABSTRACT

In one aspect, a method includes intercepting write I/Os going to a volume on a storage array and sending the write I/Os to targets on a plurality of source-side data protection appliances based on a load balancing scheme. In another aspect, an article includes a non-transitory machine-readable medium that stores executable instructions. The instructions cause a machine to intercept write I/Os going to a volume on a storage array and send the write I/Os to targets on a plurality of source-side data protection appliances based on a load balancing scheme. In a further aspect, an apparatus includes circuitry configured to intercept write I/Os going to a volume on a storage array and send the write I/Os to targets on a plurality of source-side data protection appliances based on a load balancing scheme.

15 Claims, 14 Drawing Sheets

(56) References Cited

U.S. PATENT DOCUMENTS

| | | |
|---|---|---|
| 5,990,899 A | 1/1999 | Whitten |
| 5,879,459 A | 3/1999 | Gadgil et al. |
| 6,042,652 A | 3/2000 | Hyun et al. |
| 6,065,018 A | 5/2000 | Beier et al. |
| 6,143,659 A | 11/2000 | Leem |
| 6,148,340 A | 11/2000 | Bittinger et al. |
| 6,174,377 B1 | 1/2001 | Doering et al. |
| 6,174,809 B1 | 1/2001 | Kang et al. |
| 6,203,613 B1 | 3/2001 | Gates et al. |
| 6,260,125 B1 | 7/2001 | McDowell |
| 6,270,572 B1 | 8/2001 | Kim et al. |
| 6,272,534 B1 | 8/2001 | Guha |
| 6,287,965 B1 | 9/2001 | Kang et al. |
| 6,467,023 B1 | 10/2002 | DeKoning et al. |
| 6,574,657 B1 | 6/2003 | Dickinson |
| 6,621,493 B1 | 9/2003 | Whitten |
| 6,804,676 B1 | 10/2004 | Bains, II |
| 6,947,981 B2 | 9/2005 | Lubbers et al. |
| 7,051,126 B1 | 3/2006 | Franklin |
| 7,043,610 B2 | 5/2006 | Horn et al. |
| 7,076,620 B2 | 7/2006 | Takeda et al. |
| 7,111,197 B2 | 9/2006 | Kingsbury et al. |
| 7,117,327 B2 | 10/2006 | Hirakawa et al. |
| 7,120,768 B2 | 10/2006 | Mizuno et al. |
| 7,130,975 B2 | 10/2006 | Suishu et al. |
| 7,139,927 B2 | 11/2006 | Park et al. |
| 7,159,088 B2 | 1/2007 | Hirakawa et al. |
| 7,167,963 B2 | 1/2007 | Hirakawa et al. |
| 7,203,741 B2 | 4/2007 | Marco et al. |
| 7,222,136 B1 | 5/2007 | Brown et al. |
| 7,296,008 B2 | 11/2007 | Passerini et al. |
| 7,328,373 B2 | 2/2008 | Kawamura et al. |
| 7,353,335 B2 | 4/2008 | Kawamura |
| 7,360,113 B2 | 4/2008 | Anderson et al. |
| 7,426,618 B2 | 9/2008 | Vu et al. |
| 7,516,287 B2 | 4/2009 | Ahal et al. |
| 7,519,625 B2 | 4/2009 | Honami et al. |
| 7,519,628 B1 | 4/2009 | Leverett |
| 7,546,485 B2 | 6/2009 | Cochran et al. |
| 7,577,867 B2 | 8/2009 | Lewin et al. |
| 7,590,887 B2 | 9/2009 | Kano |
| 7,606,940 B2 | 10/2009 | Yamagami |
| 7,627,612 B2 | 12/2009 | Ahal et al. |
| 7,627,687 B2 | 12/2009 | Ahal et al. |
| 7,719,443 B1 | 5/2010 | Natanzon |
| 7,757,057 B2 | 7/2010 | Sangapu et al. |
| 7,774,565 B2 | 8/2010 | Lewin et al. |
| 7,797,358 B1 | 9/2010 | Ahal et al. |
| 7,840,536 B1 | 11/2010 | Ahal et al. |
| 7,840,662 B1 | 11/2010 | Natanzon |
| 7,844,856 B1 | 11/2010 | Ahal et al. |
| 7,849,361 B2 | 12/2010 | Ahal et al. |
| 7,860,836 B1 | 12/2010 | Natanzon et al. |
| 7,882,286 B1 | 2/2011 | Natanzon et al. |
| 7,934,262 B1 | 4/2011 | Natanzon et al. |
| 7,958,372 B1 | 6/2011 | Natanzon |
| 8,037,162 B2 | 10/2011 | Marco et al. |
| 8,041,940 B1 | 10/2011 | Natanzon et al. |
| 8,060,713 B1 | 11/2011 | Natanzon |
| 8,060,714 B1 | 11/2011 | Natanzon |
| 8,103,937 B1 | 1/2012 | Natanzon et al. |
| 8,108,634 B1 | 1/2012 | Natanzon et al. |
| 8,205,009 B2 | 6/2012 | Hellen et al. |
| 8,214,612 B1 | 7/2012 | Natanzon |
| 8,250,149 B2 | 8/2012 | Marco et al. |
| 8,271,441 B1 | 9/2012 | Natanzon et al. |
| 8,271,447 B1 | 9/2012 | Natanzon et al. |
| 8,332,687 B1 | 12/2012 | Natanzon et al. |
| 8,335,761 B1 | 12/2012 | Natanzon |
| 8,335,771 B1 | 12/2012 | Natanzon et al. |
| 8,341,115 B1 | 12/2012 | Natanzon et al. |
| 8,370,648 B1 | 2/2013 | Natanzon |
| 8,380,885 B1 | 2/2013 | Natanzon |
| 8,392,680 B1 | 3/2013 | Natanzon et al. |
| 8,429,362 B1 * | 4/2013 | Natanzon et al. ............ 711/162 |
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,304 B1 | 7/2013 | Natanzon et al. |
| 8,510,279 B1 | 8/2013 | Natanzon et al. |
| 8,521,691 B1 | 8/2013 | Natanzon |
| 8,521,694 B1 | 8/2013 | Natanzon |
| 8,543,609 B1 | 9/2013 | Natanzon |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |

(56) References Cited

U.S. PATENT DOCUMENTS

| | | |
|---|---|---|
| 9,189,339 B1 | 11/2015 | Cohen et al. |
| 9,189,341 B1 | 11/2015 | Natanzon et al. |
| 9,201,736 B1 | 12/2015 | Moore et al. |
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |
| 9,244,997 B1 | 1/2016 | Natanzon et al. |
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |
| 9,305,009 B1 | 4/2016 | Bono et al. |
| 9,323,750 B2 | 4/2016 | Natanzon et al. |
| 9,330,155 B1 | 5/2016 | Bono et al. |
| 9,336,094 B1 | 5/2016 | Wolfson et al. |
| 9,336,230 B1 | 5/2016 | Natanzon |
| 9,367,260 B1 | 6/2016 | Natanzon |
| 9,378,096 B1 | 6/2016 | Erel et al. |
| 9,378,219 B1 | 6/2016 | Bono et al. |
| 9,378,261 B1 | 6/2016 | Bono et al. |
| 9,383,937 B1 | 7/2016 | Frank et al. |
| 9,389,800 B1 | 7/2016 | Natanzon et al. |
| 9,405,481 B1 | 8/2016 | Cohen et al. |
| 9,405,684 B1 | 8/2016 | Derbeko et al. |
| 9,405,765 B1 | 8/2016 | Natanzon |
| 9,411,535 B1 | 8/2016 | Shemer et al. |
| 9,459,804 B1 | 10/2016 | Natanzon et al. |
| 9,460,028 B1 | 10/2016 | Raizen et al. |
| 9,471,579 B1 | 10/2016 | Natanzon |
| 9,477,407 B1 | 10/2016 | Marshak et al. |
| 9,501,542 B1 | 11/2016 | Natanzon |
| 9,507,732 B1 | 11/2016 | Natanzon et al. |
| 9,507,845 B1 | 11/2016 | Natanzon et al. |
| 9,514,138 B1 | 12/2016 | Natanzon et al. |
| 9,524,218 B1 | 12/2016 | Veprinsky et al. |
| 9,529,885 B1 | 12/2016 | Natanzon et al. |
| 9,535,800 B1 | 1/2017 | Natanzon et al. |
| 9,535,801 B1 | 1/2017 | Natanzon et al. |
| 9,547,459 B1 | 1/2017 | BenHanokh et al. |
| 9,547,591 B1 | 1/2017 | Natanzon et al. |
| 9,552,405 B1 | 1/2017 | Moore et al. |
| 9,557,921 B1 | 1/2017 | Cohen et al. |
| 9,557,925 B1 | 1/2017 | Natanzon |
| 9,563,517 B1 | 2/2017 | Natanzon et al. |
| 9,563,684 B1 | 2/2017 | Natanzon et al. |
| 9,575,851 B1 | 2/2017 | Natanzon et al. |
| 9,575,857 B1 | 2/2017 | Natanzon |
| 9,575,894 B1 | 2/2017 | Natanzon et al. |
| 9,582,382 B1 | 2/2017 | Natanzon et al. |
| 9,588,703 B1 | 3/2017 | Natanzon et al. |
| 9,588,847 B1 | 3/2017 | Natanzon et al. |
| 9,594,822 B1 | 3/2017 | Natanzon et al. |
| 9,600,377 B1 | 3/2017 | Cohen et al. |
| 9,619,543 B1 | 4/2017 | Natanzon et al. |
| 9,632,881 B1 | 4/2017 | Natanzon |
| 9,665,305 B1 | 5/2017 | Natanzon et al. |
| 9,710,177 B1 | 7/2017 | Natanzon |
| 9,720,618 B1 | 8/2017 | Panidis et al. |
| 9,722,788 B1 | 8/2017 | Natanzon et al. |
| 9,727,429 B1 | 8/2017 | Moore et al. |
| 9,733,969 B2 | 8/2017 | Derbeko et al. |
| 9,737,111 B2 | 8/2017 | Lustik |
| 9,740,572 B1 | 8/2017 | Natanzon et al. |
| 9,740,573 B1 | 8/2017 | Natanzon |
| 9,740,880 B1 | 8/2017 | Natanzon et al. |
| 9,749,300 B1 | 8/2017 | Cale et al. |
| 9,772,789 B1 | 9/2017 | Natanzon et al. |
| 9,798,472 B1 | 10/2017 | Natanzon et al. |
| 9,798,490 B1 | 10/2017 | Natanzon |
| 9,804,934 B1 | 10/2017 | Natanzon et al. |
| 9,811,431 B1 | 11/2017 | Natanzon et al. |
| 9,823,865 B1 | 11/2017 | Natanzon et al. |
| 9,823,973 B1 | 11/2017 | Natanzon |
| 9,832,261 B2 | 11/2017 | Don et al. |
| 9,846,698 B1 | 12/2017 | Panidis et al. |
| 9,875,042 B1 | 1/2018 | Natanzon et al. |
| 9,875,162 B1 | 1/2018 | Panidis et al. |
| 9,880,777 B1 | 1/2018 | Bono et al. |
| 9,881,014 B1 | 1/2018 | Bono et al. |
| 9,910,620 B1 | 3/2018 | Veprinsky et al. |
| 9,910,621 B1 | 3/2018 | Golan et al. |
| 9,910,735 B1 | 3/2018 | Natanzon |
| 9,910,739 B1 | 3/2018 | Natanzon et al. |
| 9,917,854 B2 | 3/2018 | Natanzon et al. |
| 9,921,955 B1 | 3/2018 | Derbeko et al. |
| 9,933,957 B1 | 4/2018 | Cohen et al. |
| 9,934,302 B1 | 4/2018 | Cohen et al. |
| 9,940,205 B2 | 4/2018 | Natanzon |
| 9,940,460 B1 | 4/2018 | Derbeko et al. |
| 9,946,649 B1 | 4/2018 | Natanzon et al. |
| 9,959,061 B1 | 5/2018 | Natanzon et al. |
| 9,965,306 B1 | 5/2018 | Natanzon et al. |
| 9,990,256 B1 | 6/2018 | Natanzon |
| 9,996,539 B1 | 6/2018 | Natanzon |
| 10,007,626 B1 | 6/2018 | Saad et al. |
| 10,019,194 B1 | 7/2018 | Baruch et al. |
| 10,025,931 B1 | 7/2018 | Natanzon et al. |
| 10,031,675 B1 | 7/2018 | Veprinsky et al. |
| 10,031,690 B1 | 7/2018 | Panidis et al. |
| 10,031,692 B2 | 7/2018 | Elron et al. |
| 10,031,703 B1 | 7/2018 | Natanzon et al. |
| 10,037,251 B1 | 7/2018 | Bono et al. |
| 10,042,579 B1 | 8/2018 | Natanzon |
| 10,042,751 B1 | 8/2018 | Veprinsky et al. |
| 10,055,146 B1 | 8/2018 | Natanzon et al. |
| 10,055,148 B1 | 8/2018 | Natanzon et al. |
| 10,061,666 B1 | 8/2018 | Natanzon et al. |
| 10,067,694 B1 | 9/2018 | Natanzon et al. |
| 10,067,837 B1 | 9/2018 | Natanzon et al. |
| 10,078,459 B1 | 9/2018 | Natanzon et al. |
| 10,082,980 B1 | 9/2018 | Cohen et al. |
| 10,083,093 B1 | 9/2018 | Natanzon et al. |
| 10,095,489 B1 | 10/2018 | Lieberman et al. |
| 10,101,943 B1 | 10/2018 | Ayzenberg et al. |
| 2002/0129168 A1 | 9/2002 | Kanai et al. |
| 2003/0048842 A1 | 3/2003 | Fourquin et al. |
| 2003/0061537 A1 | 3/2003 | Cha et al. |
| 2003/0110278 A1 | 6/2003 | Anderson |
| 2003/0145317 A1 | 7/2003 | Chamberlain |
| 2003/0196147 A1 | 10/2003 | Hirata et al. |
| 2004/0205092 A1 | 10/2004 | Longo et al. |
| 2004/0250032 A1 | 12/2004 | Ji et al. |
| 2004/0254964 A1 | 12/2004 | Kodama et al. |
| 2005/0015663 A1 | 1/2005 | Armangau et al. |
| 2005/0028022 A1 | 2/2005 | Amano |
| 2005/0049924 A1 | 3/2005 | DeBettencourt et al. |
| 2005/0172092 A1 | 8/2005 | Lam et al. |
| 2005/0273655 A1 | 12/2005 | Chow et al. |
| 2006/0031647 A1 | 2/2006 | Hirakawa et al. |
| 2006/0047996 A1 | 3/2006 | Anderson et al. |
| 2006/0064416 A1 | 3/2006 | Sim-Tang |
| 2006/0107007 A1 | 5/2006 | Hirakawa et al. |
| 2006/0117211 A1 | 6/2006 | Matsunami et al. |
| 2006/0161810 A1 | 7/2006 | Bao |
| 2006/0179343 A1 | 8/2006 | Kitamura |
| 2006/0195670 A1 | 8/2006 | Iwamura et al. |
| 2006/0212462 A1 | 9/2006 | Hellen et al. |
| 2007/0055833 A1 | 3/2007 | Vu et al. |
| 2007/0162513 A1 | 7/2007 | Lewin et al. |
| 2007/0180304 A1 | 8/2007 | Kano |
| 2007/0198602 A1 | 8/2007 | Ngo et al. |
| 2007/0198791 A1 | 8/2007 | Iwamura et al. |
| 2007/0220311 A1* | 9/2007 | Lewin et al. ............ 714/6 |
| 2007/0266053 A1 | 11/2007 | Ahal et al. |
| 2008/0082591 A1 | 4/2008 | Ahal et al. |

(56) References Cited

U.S. PATENT DOCUMENTS

2008/0082592 A1    4/2008    Ahal et al.
2008/0082770 A1    4/2008    Ahal et al.

OTHER PUBLICATIONS

Soules, "Metadata Efficiency in Versioning File Systems;" 2003; 16 Pages.
AIX System Management Concepts: Operating Systems and Devices; May 2000; 280 Pages.
Soules et al.; "Metadata Efficiency in a Comprehensive Versioning File System;" May 2002; CMU-CS-02-145; School of Computer Science, Carnegie Mellon University, Pittsburgh, PA 15213; 33 Pages.
Linux Filesystems; Sams Publishing; 2002; 12 Pages.
Bunyan, "Multiplexing in a BrightStor® ARCserve® Backup Release 11;" Mar. 2004; 4 Pages.
Marks, "Network Computing;" Feb. 2, 2006; 8 Pages.
Hill, "Network Computing;" Jun. 8, 2006; 9 Pages.
Microsoft Computer Dictionary; 2002; Press Fifth Edition; 3 Pages.
Retrieved from http://en.wikipedia.org/wiki/DEFLATE; DEFLATE; Jun. 19, 2008; 6 Pages.
Retrieved from http://en.wikipedia.org/wiki/Huffman_coding; Huffman Coding; Jun. 8, 2008; 11 Pages.
Retrieved from http:///en.wikipedia.org/wiki/LZ77; LZ77 and LZ78; Jun. 17, 2008; 2 Pages.
U.S. Appl. No. 11/609,560.
U.S. Appl. No. 12/057,652.
U.S. Appl. No. 11/609,561.
U.S. Appl. No. 11/356,920.
U.S. Appl. No. 10/512,687.
U.S. Appl. No. 11/536,233.
U.S. Appl. No. 11/536,215.
U.S. Appl. No. 11/536,160.
U.S. Appl. No. 11/964,168.

* cited by examiner

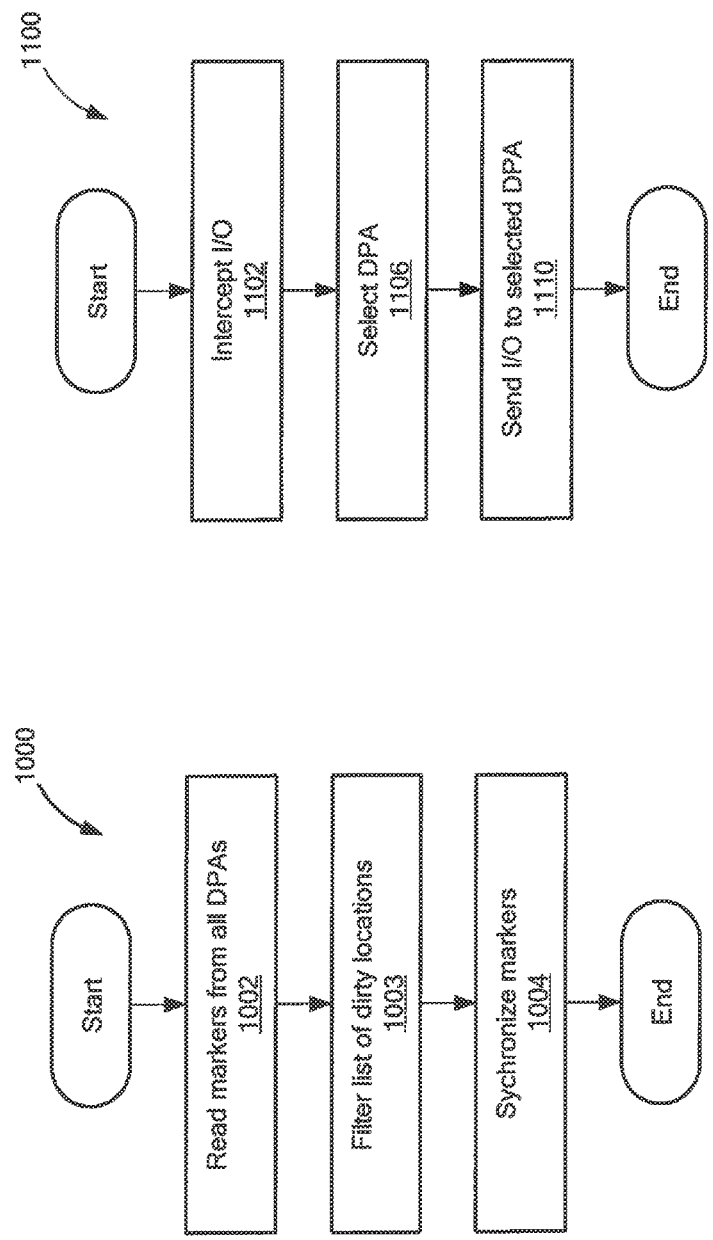

DISTRIBUTED SCALE-OUT REPLICATION

BACKGROUND

Computer data is vital to today's organizations, and a significant part of protection against disasters is focused on data protection. As solid-state memory has advanced to the point where cost of memory has become a relatively insignificant factor, organizations may afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site may recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling roll back of the backup storage to previous points in time. Journaling was first implemented in database systems, and was later extended to broader data protection.

One challenge to continuous data protection is the ability of a backup site to keep pace with the data transactions of a production site, without slowing down the production a site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

In one aspect, a method includes intercepting write I/Os going to a volume on a storage array and sending the write I/Os to targets on a plurality of source-side data protection appliances based on a load balancing scheme.

In another aspect, an article includes a non-transitory machine-readable medium that stores executable instructions. The instructions cause a machine to intercept write I/Os going to a volume on a storage array and send the write I/Os to targets on a plurality of source-side data protection appliances based on a load balancing scheme.

In a further aspect, an apparatus includes circuitry configured to intercept write I/Os going to a volume on a storage array and send the write I/Os to targets on a plurality of source-side data protection appliances based on a load balancing scheme.

DESCRIPTION OF THE DRAWINGS

FIG. 10 is a flowchart of an example of a process to perform recovery.

FIG. 11 is a flowchart of an example of a process to handle I/Os at a data protection agent.

DETAILED DESCRIPTION

Figure 1:
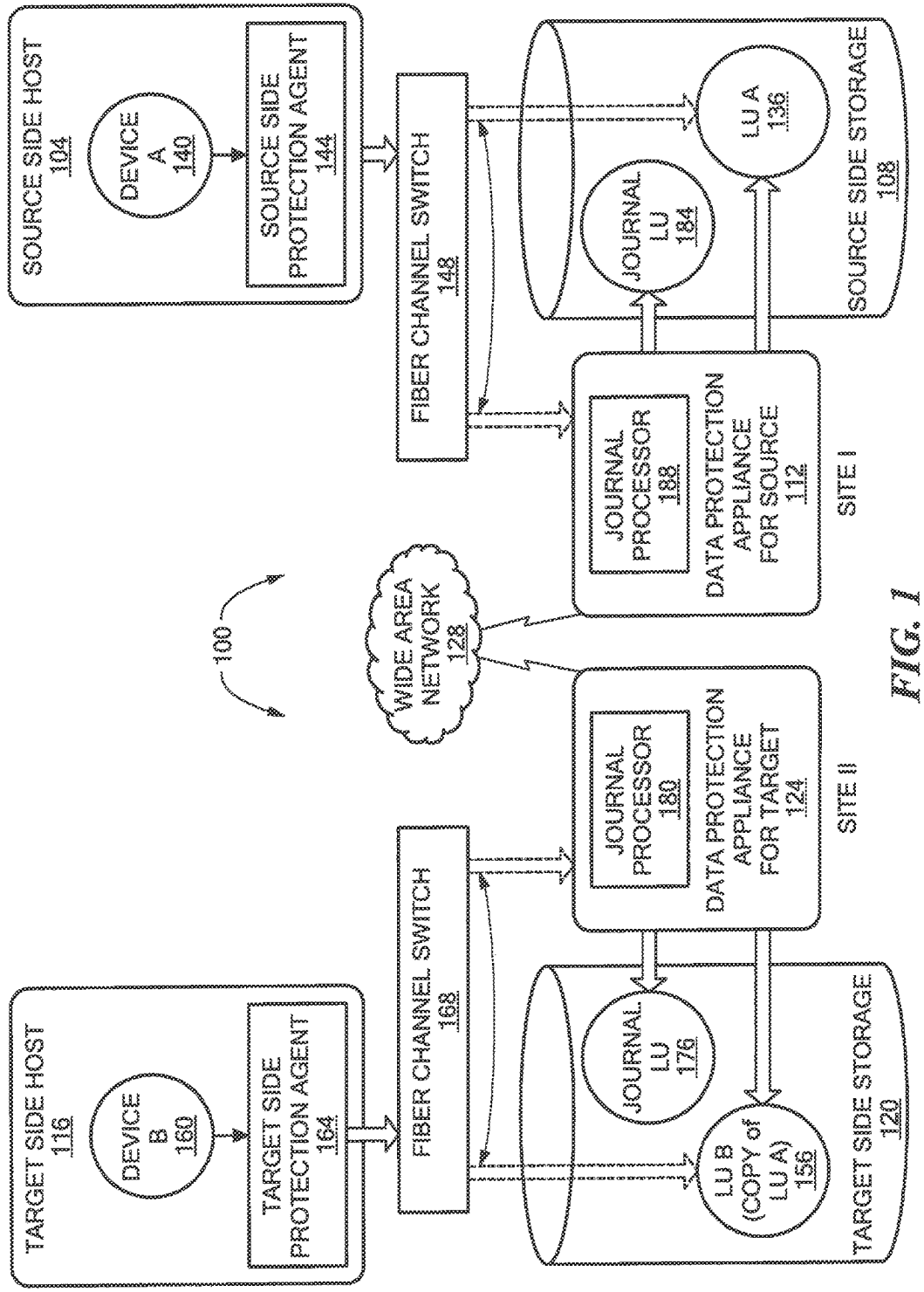
FIG. 1 is a block diagram of an example of a data protection system.

Described herein are various techniques to replicate data using consistency groups. Replication of one consistency group may be across several replication appliances (called herein data protection appliances (DPA)). In one example, volumes may be striped. Each volume may be presented as a set of stripes striped volume. A new virtual CG may be formed which may include several internal CGs. The virtual CG may be presented to the user and the user may be able to perform all actions on the virtual CG. Internally, in some examples, each internal CG may replicate just some of the stripes of the volumes. As well a consistency point may be achieved across internal CGs. That is, it may be possible to form an image of a particular time by rolling each internal CG group to that time. In some examples, the internal CGs may not be exposed to the user and all actions happen automatically on the internal CGs when performed on the virtual CG. Internal CG groups may also be referred to as Grid Copies.

Typical replication technologies either run in the array or run on network or host. Conventional array based technologies are limited to the internal array and are homogenous, network technologies limited to replicating whole LUs (logical units). The typical arrays have trouble replicating a high performance environment in a single consistency group, or have trouble with real time load balancing. Current host based replication is usually limited, intrusive and cannot replicate data shared in clusters. Conversely, the current specification, in some examples, enable load balancing though the volume virtualization and enables high performance replication using clusters of replication devices.

The following definitions may be useful in understanding the specification and claims.

BACKUP SITE—a facility where replicated production site data is stored; the backup site may be located in a remote site or at the same location as the production site;

Data Protection Appliance (DPA)—a computer or a cluster of computers responsible for data protection services including inter alia data replication of a storage system, and journaling of I/O requests issued by a host computer to the storage system;

CG—consistency group—a set of logical units (LUs) which are replicated together for which write order fidelity is preserved;

Grid Copy—another name for an internal consistency group, a grid copy is a unit of replication which runs on a single replication appliance and replicates part of consistency group data;

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

INTERNAL CONSISTENCY GROUP—another name for grid copy. A consistency Group includes one or more internal consistency groups;

I/O REQUEST—an input/output request which may be a read I/O request (read request) or a write I/O request (write request), also referred to as an I/O;

JOURNAL—a record of write transactions issued to a storage system; used to maintain a duplicate storage system, and to roll back the duplicate storage system to a previous point in time;

LOGICAL UNIT—a logical entity provided by a storage system for accessing data from the storage system;

LUN—a logical unit number for identifying a logical unit;

PHYSICAL STORAGE UNIT—a physical entity, such as a disk or an array of disks, for storing data in storage locations that can be accessed by address;

PRODUCTION SITE—a facility where one or more host computers run data processing applications that write data to a storage system and read data from the storage system;

REMOTE ACKNOWLEDGEMENTS—an acknowledgement from remote DPA to the local DPA that data arrived at the remote DPA (either to the appliance or the journal);

SPLITTER ACKNOWLEDGEMENT—an acknowledgement from a DPA to a data protection agent (splitter) that data has been received at the DPA; this may be achieved by a SCSI status command;

SAN—a storage area network of nodes that send and receive I/O and other requests, each node in the network being an initiator or a target, or both an initiator and a target;

SOURCE SIDE—a transmitter of data within a data replication workflow, during normal operation a production site is the source side; and during data recovery a backup site is the source side;

STORAGE SYSTEM—a SAN entity that provides multiple logical units for access by multiple SAN initiators;

TARGET—a node in a SAN that replies to I/O requests;

TARGET SIDE—a receiver of data within a data replication workflow; during normal operation a back site is the target side, and during data recovery a production site is the target side;

VIRTUAL CONSISTENCY GROUP—represents a consistency group and includes one or more internal consistency groups (grid copies) sometimes over more than one DPA; and WAN—a wide area network that connects local networks and enables them to communicate with one another, such as the Internet.

A description of journaling and some techniques associated with journaling may be described in the patent titled "METHODS AND APPARATUS FOR OPTIMAL JOURNALING FOR CONTINUOUS DATA REPLICATION" and with U.S. Pat. No. 7,516,287, which is hereby incorporated by reference.

An Example of a Replication System

Referring to FIG. 1, a data protection system 100 includes two sites; Site I, which is a production site, and Site II, which is a backup site. Under normal operation the production site is the source side of system 100, and the backup site is the target side of the system. The backup site is responsible for replicating production site data. Additionally, the backup site enables roll back of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks may be used.

Each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124. As well, the data protection agent (splitter) may run on the host, or on the storage, or in the network, and that DPAs are optional and DPA code may run on the storage array too.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

The host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). Storage system 108 exposes a logical unit 136, designated as LU A, and storage system 120 exposes a logical unit 156, designated as LU B.

LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. Host device 104 identifies LU A and generates a corresponding host device 140, designated as Device A, through which it can access LU A. Similarly, host computer 116 identifies LU B and generates a corresponding device 160, designated as Device B.

In the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail herein, when acting as a target side DPA, a DPA may also enable roll back of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

Host computer 104 and host computer 116 include data protection agents 144 and 164, respectively. Data protection agents 144 and 164 intercept SCSI commands issued by their respective host computers, via host devices to logical units that are accessible to the host computers. A data protection agent (also referred to herein as a splitter or simply as a protection agent) may act on an intercepted SCSI commands issued to a logical unit, in one of the following ways: send the SCSI commands to its intended logical unit; redirect the SCSI command to another logical unit; split the SCSI command by sending it first to the respective DPA; after the DPA returns an acknowledgement, send the SCSI command to its intended logical unit; fail a SCSI command by returning an error return code; and delay a SCSI command by not returning an acknowledgement to the respective host computer.

A data protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A data protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber a channel. The communication may be direct, or via a logical unit exposed by the DPA. Protection agents communicate with their respective DPAs by sending SCSI commands over fiber channel.

Protection agents 144 and 164 are drivers located in their respective host computers 104 and 116. Alternatively, a protection agent may also be located in a fiber channel switch, or in any other device situated in a data path between a host computer and a storage system or on the storage system itself.

What follows is a detailed description of system behavior under normal production mode, and under recovery mode.

In production mode DPA 112 acts as a source site DPA for LU A. Thus, protection agent 144 is configured to act as a source side protection agent; i.e., as a splitter for host device A. Specifically, protection agent 144 replicates SCSI I/O write requests. A replicated SCSI I/O write request is sent to DPA 112. After receiving an acknowledgement from DPA 124, protection agent 144 then sends the SCSI I/O write request to LU A. After receiving a second acknowledgement from storage system 108 host computer 104 acknowledges that an I/O command complete.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

Target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 enters write transactions received by DPA 124 from DPA 112 into the journal, by writing them into the journal LU, reads the undo information for the transaction from LU B, updates the journal entries in the journal LU with undo information, applies the journal transactions to LU B, and removes already-applied transactions from the journal.

Figure 2:
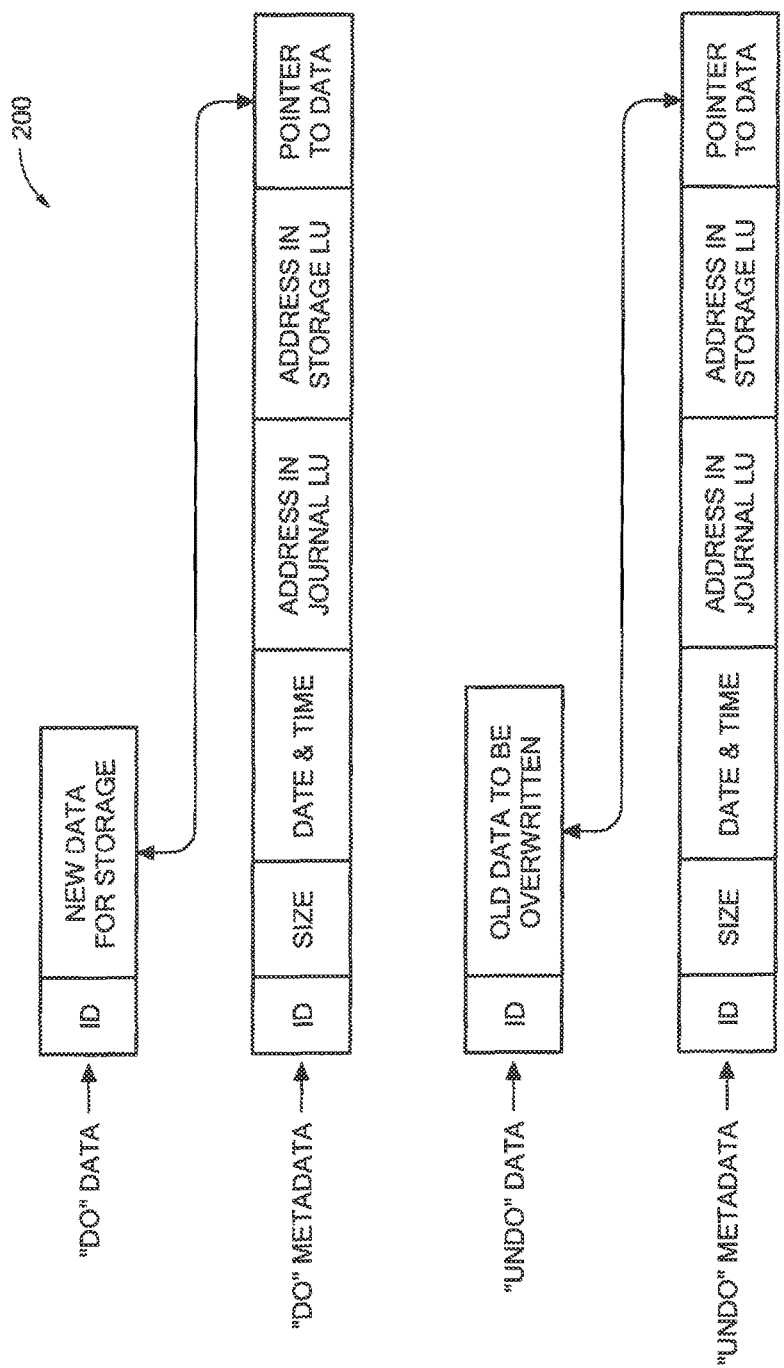
FIG. 2 is an illustration of an example of a journal history of write transactions for a storage system.

Referring to FIG. 2, which is an illustration of a write transaction 200 for a journal. The journal may be used to provide an adaptor for access to storage 120 at the state it was in at any specified point in time. Since the journal contains the "undo" information necessary to roll back storage system 120, data that was stored in specific memory locations at the specified point in time may be obtained by undoing write transactions that occurred subsequent to such point in time.

Write transaction 200 generally includes the following fields: one or more identifiers; a time stamp, which is the date & time at which the transaction was received by source side DPA 112; a write size, which is the size of the data block; a location in journal LU 176 where the data is entered; a location in LU B where the data is to be written; and the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a pre-defined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

In some examples, DPAs may be virtual machines and the data protection agents may run in a storage array, a host, in a fabric switch or at a hypervisor layer. The data protection may run in a hypervisor kernel replicating a single virtual machine, or in any other location at the data path for both virtual or physical environments.

Virtual Consistency Groups

A virtual Consistency Group may be used to present a single Consistency Group which may span several different appliances. In some examples, forming one large consistency group is achieved by n internal consistency groups (iCGs) or grid copies. Each grid copy may have the same configuration as the original consistency group, i.e., user volumes and journal volumes. Each internal CG may be also called a Grid Copy (e.g., as labeled in FIG. 8A).

Figure 3:
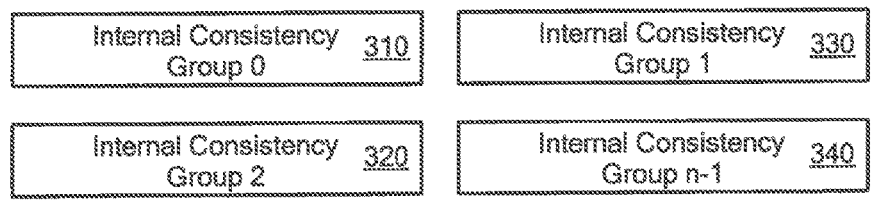
FIG. 3 is a block diagram of an example of internal consistency groups.
Figure 4:
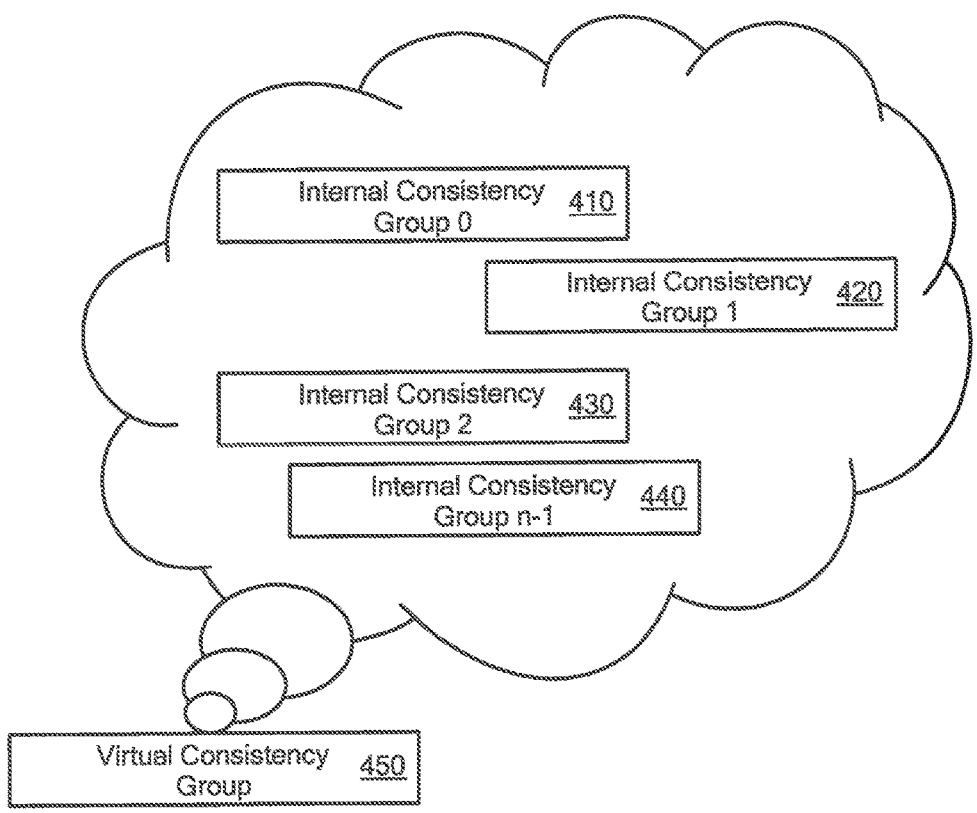
FIG. 4 is a block diagram of an example of a virtual consistency group.

The grid copies may be numbered 0, . . . , n-1. For example refer to FIGS. 3 and 4. FIG. 3 illustrates a sample internal consistency groups or grid copies, labeled as internal consistency groups 310, 320, 330, 340. FIG. 4 illustrates how these internal CGs 410, 420, 430 and 440 may be used to form a virtual consistency group 450.

Figure 5:
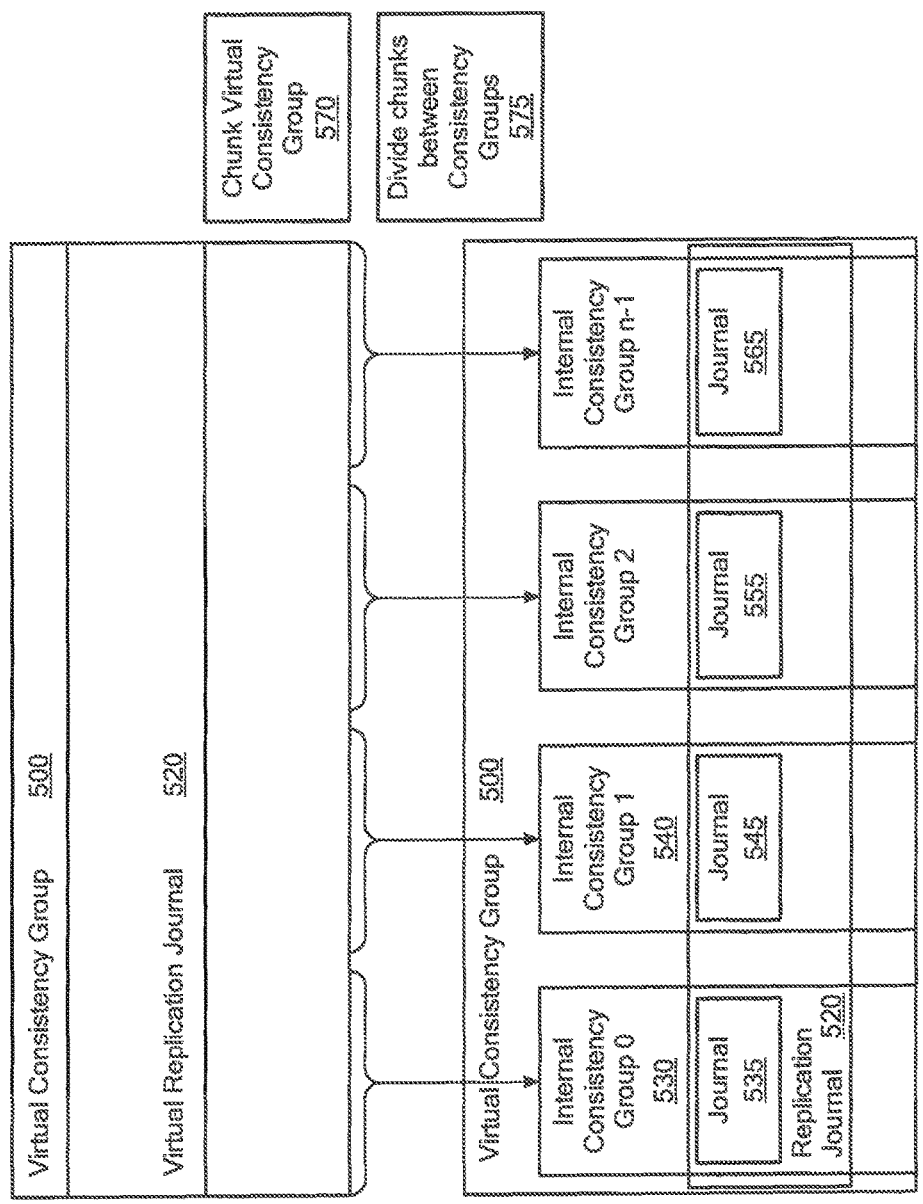
FIG. 5 is a block diagram of another example of the virtual consistency group.

Referring to FIG. 5, a Virtual Consistency group 500 is shown. This Virtual consistency group 500 may have a virtual replication journal 520 and may be presented to the user. In some examples, the virtual journal, such as virtual journal 520 may be created by the user. The Virtual Consistency group 500 may include several internal consistency groups or grid copies, such as internal CGs 530, 540, 550 and 560. These grid copies may each be responsible for a portion of the replication handled by the consistency group. As well, each grid copy may have a journal, such as journals 535, 545, 555, and 565 which may correspond to a piece or segment of the replication journal 520 of the virtual consistency group 500. The user volumes of consistency group 500 are chunked 570 and divided 575 between the grid copies.

Figure 6:
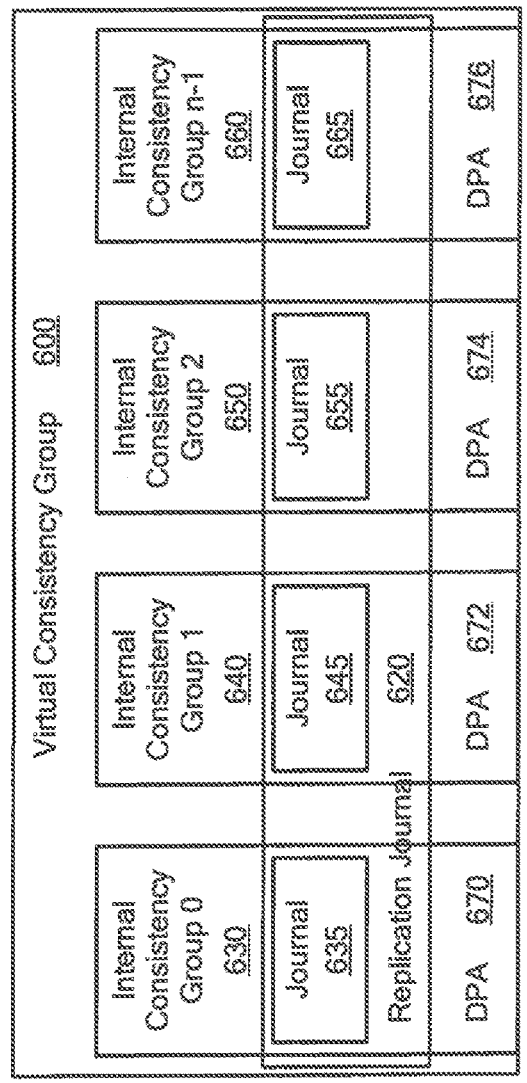
FIG. 6 is a block diagram of further example of the virtual consistency group.

Referring to FIG. 6, each grid copy can run on a different Data protection appliance such as DPA 670, 672, 674 and 676. As well, a DPA may run multiple grid copies. Each grid copy may contain a portion of the virtual replication journal 620 for a replication of a volume or multiple volumes. That is, each internal consistency group (grid copy), 630, 640, 650, and 660 may be responsible for recording a portion of the journal 620, which corresponds to a portion of the replication of the virtual consistency group 600. Replication of user volumes may be divided into sections and each grid copy, 630, 640, 650, and 660 may be responsible for an equal section, each grid copy may be responsible for replicating its portion of the user volumes and every grid copy may create its own journal curved from the global journal. The grid copy may use the piece of the journal corresponding to that section, such as Journals 635, 645, 655, and 665, to generate a DO stream and UNDO stream for each section.

Figure 7:
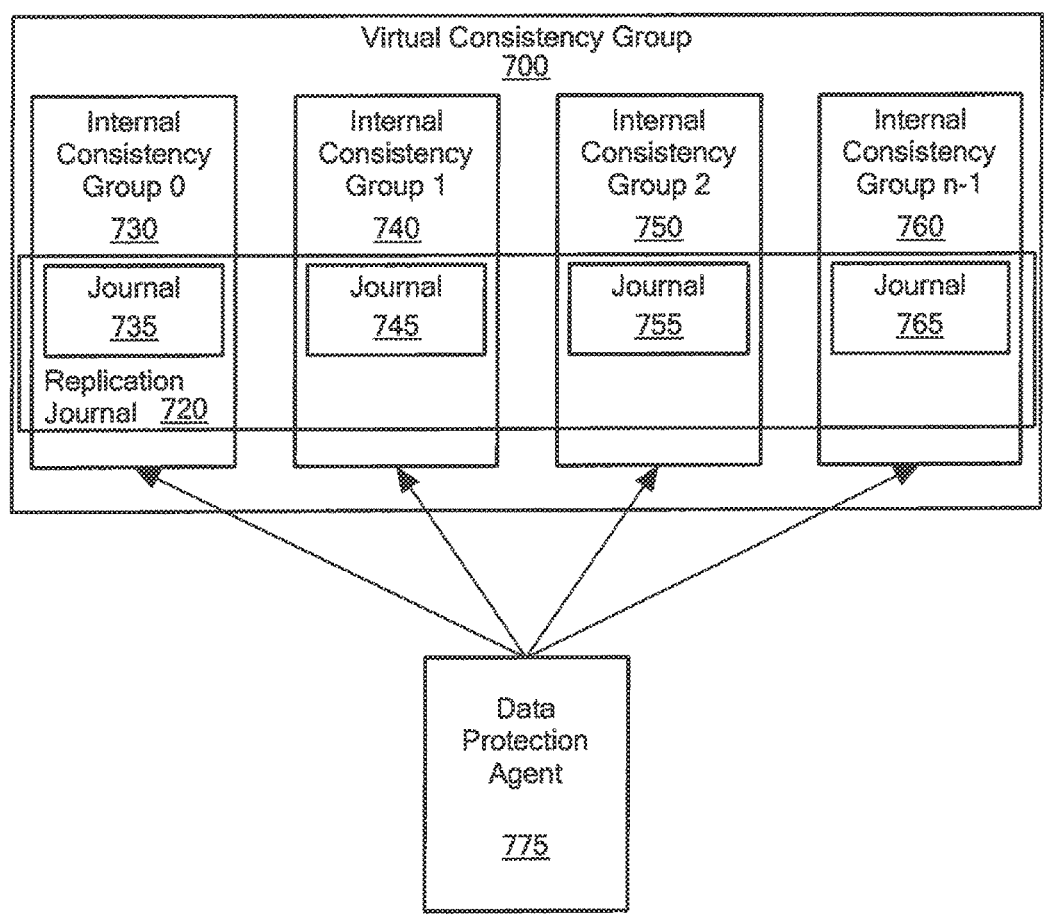
FIG. 7 is a block diagram of an example of the virtual consistency group receiving I/Os.

Referring to FIG. 7, the virtual consistency group 700 includes internal consistency group (grid copies) 730, 740, 750 and 760 and may be responsible for recording a portion of the journal 720. The grid copy may use the piece of the journal corresponding to that section, such as Journals 735, 745, 755, and 765, to generate a DO stream and UNDO stream for each section.

All the grid copies (internal consistency groups) behave in an identical way. A data protection agent 775 is aware that a replicated volume is replicated by multiple data protection appliances, since a target for replication of the volume is exposed by multiple DPAs. The data protection agent 775 may send I/Os intercepted by the volume to any of the data protection appliances replicating the volume. The data protection agent 775 may use load balancing techniques to assure that the load on each of the appliances is similar and prevent data protection appliances from being over loaded.

Further, the virtual consistency group 700 may be used for replication of a single volume. As well, the virtual consistency group 700 may be used to replicate multiple volumes. In one example, the virtual consistency group 700 may represent any number of underlying internal consistency groups (grid copies), or DPAs, however the virtual consistency group may be presented to the user as a single consistency group.

Splitting the Data

Figure 8A:
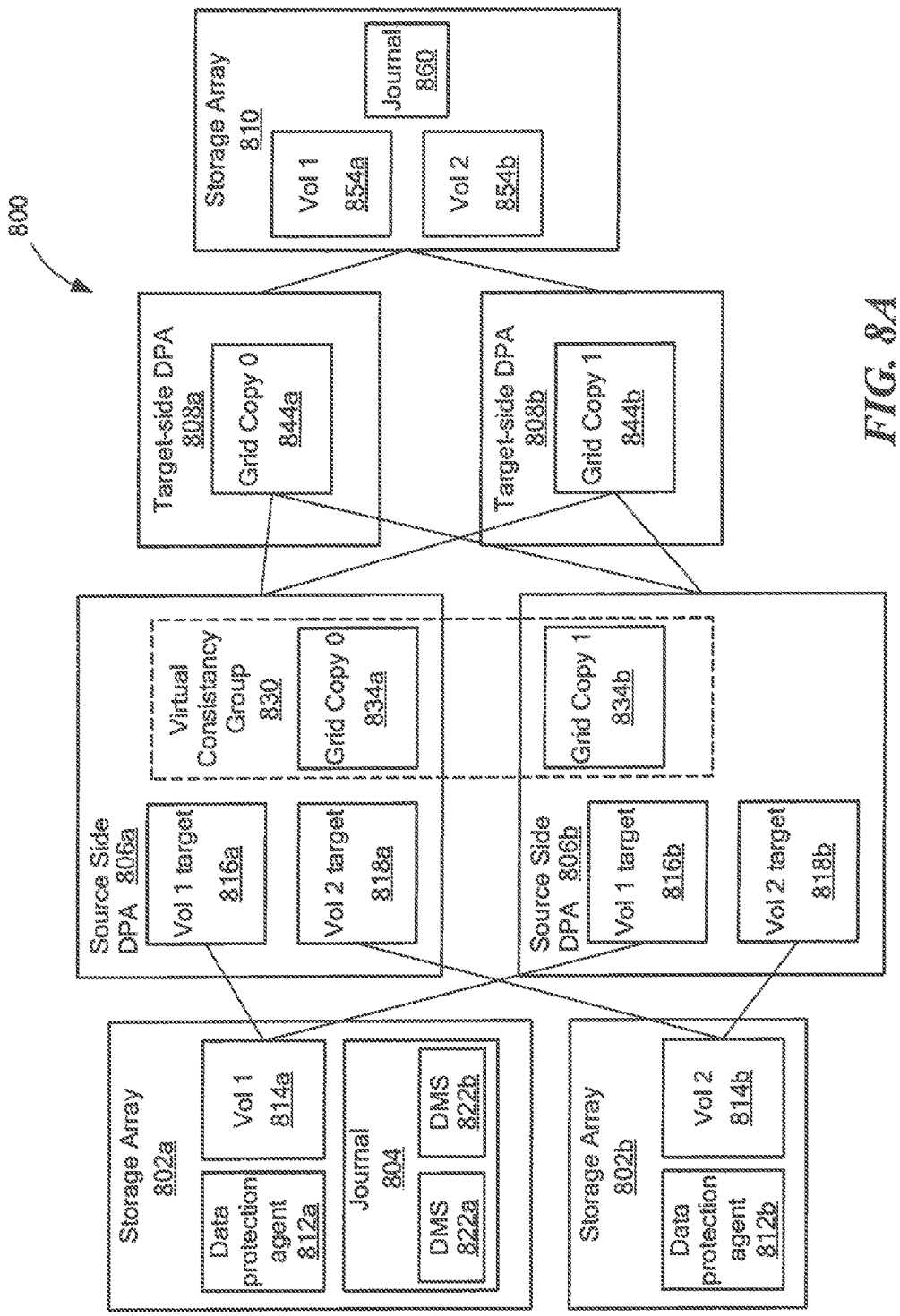
FIG. 8A is a block diagram of an example of a distributed scale-out replication system.
Figure 8B:
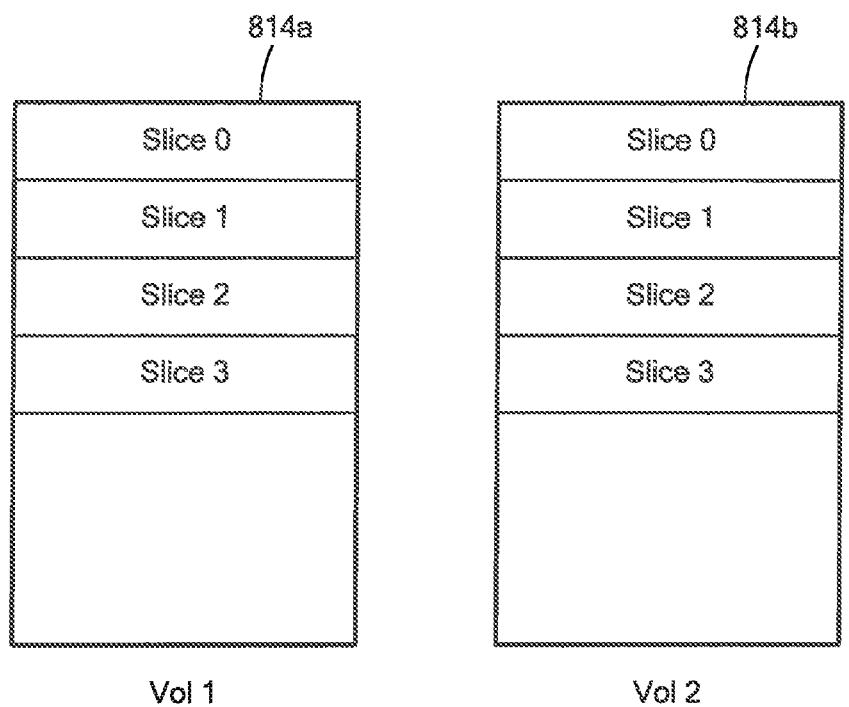
FIG. 8B is a block diagram of volume that are segregated into slices.

Referring to FIGS. 8A and 8B, an example of a distributed scale-out replication system is a system 800. It should be noted that FIG. 8A is a specific example that includes a virtual consistency group with two grid copies (grid copy 0 834a and grid copy 1 834b), that is, n=2 whereas the previous figures included n grid copies (e.g., grid copy 0, grid copy 1, grid copy 2, . . . , grid copy n-1) in the virtual consistency group. One of ordinary skill in the art would recognize that additional grid copies may be added to the virtual consistency group 830 of FIG. 8A.

System 800 includes storage arrays (e.g., a storage array 802*a*, a storage array 802*b*), source-side data protection appliances (DPAs) (a source-side DPA 806*a*, a source side DPA 806*b*), target-side DPAs (e.g., a target-side DPA 808*a*, a target-side DPA 808*b*) and a storage array 810. The storage array 802*a* includes a journal 804, a data protection agent 812*a* and volume 1 814*a* and the storage array 802*b* includes a data protection agent 1412*b* and volume 1 814*b*.

The source-side DPA 806*a* exposes targets (e.g., a volume 1 target 816*a* and a volume 2 target 818*a*) and maintains a delta marking stream (DMS) 822*a* at the journal 804 on a storage array 802*a*. The source-side DPA 806*b* exposes targets (e.g., a volume 1 target 816*b* and a volume 2 target 818*b*) and maintains a delta marking stream (DMS) 822*b* on the journal 804 on storage 802*a*. The protection agent 812*a* splits (write) I/Os going to the volume 1 814*a* to either the volume 1 target 816*a* or the volume 1 target 816*b*. The protection agent 812*b* splits (write) I/Os going to volume 2 814*b* to either volume 2 target 818*a* or the volume 2 target 818*b*. In one example, I/Os from volume 1 814*a* are sent to the volume 1 target 816*a* and volume 1 target 816*b* in a round robin fashion. One of ordinary skill in the art would appreciate that targets may not necessarily be volume targets such as volume 1 targets 816*a*, 818*a* and volume 2 targets 816*b*, 818*b* but may instead be another type of data storage location.

A virtual consistency group 830 includes the grid copy 0 834*a* at the source-side DPA 806*a* and the grid copy 1 834*b* on the source-side DPA 806*b*. The target-side DPA 808*a* includes a grid copy 0 844*a* and the target-side DPA 808*b* includes a grid copy 1 844*b*. Each grid copy 844*a*, 844*b* is a unit of replication which is responsible for replication of a portion of the data of the full virtual consistency group 830.

In order to be able to replicate high performance volumes, the volumes are broken up into slices, for example slices of 1 MB size. In one particular example, if the virtual consistency group 830 is composed of two grid copies, each grid copy will be responsible for the replication of half of the slices. In another example, if the virtual consistency group 830 is composed of four grid copies, then each grid copy will be responsible for the replication of a quarter of the slices of each volume.

In one example, the target-side DPA 808*a* receives even-numbered slices (e.g., slice 0, slice 2, and so forth (FIG. 8B)) of the volumes 1 and 2 814*a*, 814*b* and the target-side DPA 808*b* receives odd-numbered slices (slice 1, slice 3 and so forth (FIG. 8B)) of the volumes 1 and 2 814*a*, 814*b*.

The storage array 810 includes a volume 1 854*a*, which is a replication of volume 1 814*a*, a volume 2 854*b*, which is a replication of volume 2 814*b*, and a replica journal 860.

At the target-side, grid copy 844*a* is responsible for the replication of the even slices. Thus, all I/Os going to even sliced portions of either volume 1 814*a* or volume 2 814*b* are sent to the DPA 808*b* which runs grid copy 844*b*. The grid copy 844*b* journals the I/Os to the portion of the journal 860 which grid copy 844*b* uses and applies the I/Os to the corresponding volume 854*a*, 854*b* at the storage array 810.

Grid copy 844B is responsible for the replication of the odd slices. All I/Os going to odd sliced portions of either the volume 1 814*a* or the volume 2 814*b* are sent to the DPA 808*b* which runs grid copy 844*b*. The grid copy 844*b* journals the I/Os to the portion of the journal 860 which grid copy 844*b* uses and applies the I/Os to the corresponding volume 854*a*, 854*b* at storage array 810.

Figure 9:
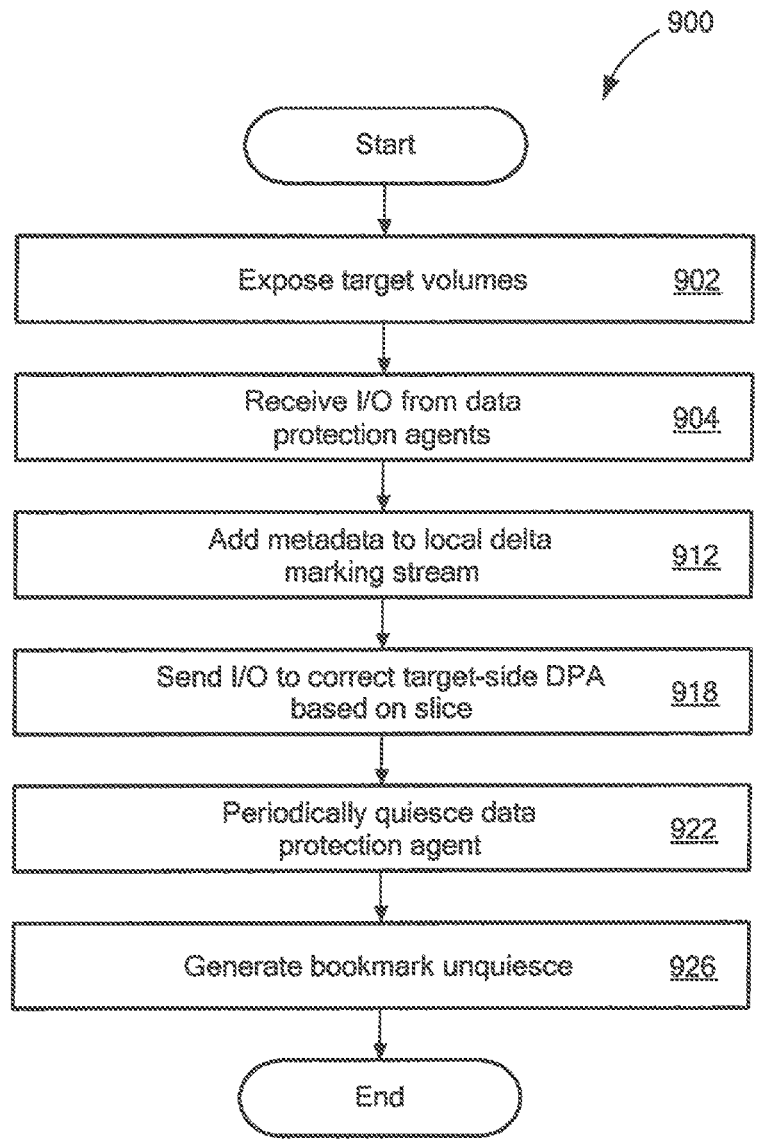
FIG. 9 is a flowchart of an example of a process to handle I/Os at a source-side data protection appliance.

Referring to FIG. 9, an example of a process to handle I/Os at a source-side data protection appliance is a process 900. The process 900 exposes (i.e., makes accessible) target volumes to data protection agents (902). For example, the source-side DPA 806*a* exposes volume 1 target 816*a* and volume 2 target 818*a* to the data protection agents 812*a*, 812*b*. Volumes 1 and 2 targets 816*a*, 816*b* may have the same SCSI personality so that multipath drivers may be able to select between them.

Process 900 receives I/Os from the data protection agents 812*a*, 812*b* (904). For example, the data protection agent 812*a* sends an I/O from the first volume 814*a* to the volume 1 target 816*a* at the source-side DPA 806*a*.

Process 900 adds metadata to the local delta marking stream (912). For example, if an I/O is received from the source-side storage array 806*a* to volume 1 target 816*a*, then metadata describing an IO arrival to volume 814*a* is written to the journal containing the metadata stream for grid copy 834*a* by the DMS 822*a* service.

Process 900 sends I/Os to the correct target-side DPA (918). For example, even-numbered slices are sent to the target-side DPA 808*a* and odd-numbered slices are sent to the target-side DPA 808*b*.

Process 900 periodically quiesces I/Os arriving from the data protection agents so (922). For example, the data is quiesced by notifying all DPAs running an internal CG of the CG to stop acknowledging new I/Os arriving from the data protection agents 812*a*, 812*b* to volumes replicated by the CG. A bookmark is created. A bookmark is a notification which is kept at the replica journal 860 and indicates a point of consistency. Once the bookmark is created for all the grid copies of the CG, the I/Os are unquiesced (926) and the DPAs continue to acknowledge new I/Os.

Referring to FIG. 10, an example of a process to perform recovery from a failure of one of the replication components is a process 1000. In one example, process 1000 runs separately at each grid copy. The process 1000 reads the metadata from the delta marker stream of all the grid copy markers for all the grid copies (1002).

The process 1000 filters (1003) the list of dirty locations to be the only locations of which are inside slices which are handled by the relevant grid copy. For example, the process running at the grid copy 834*a* will filter only locations on the disk which are inside even slices of the replicated volume, and a process running at the grid copy 834*b* will only filter locations which are inside odd slices of the replicated volume and synchronizes the markers relevant for slices replicated by the corresponding appliance (1004). Synchronization includes reading the locations which are marked as dirty (only the locations which remained after the filtering), sending the dirty locations to the replica site and writing the data to the replication journal 860.

Referring to FIG. 11, an example of a process to handle I/Os at a data protection agent is a process 1100. Process 1100 intercepts an I/O (1102). For example, the data protection agent 812*a* intercepts an I/O for the volume 814*a*.

Process 1100 selects a DPA to send the intercepted I/O (1106) and sends the I/O to the selected DPA. For example, the data protection agent 812 determines which source-side DPA to send the intercepted I/O. For example, the V/Os may be sent in a round robin fashion. In another example, a multi-path processor determines the source-side DPA to send the intercepted I/O.

Journal

For a replicated volume or volumes, the journal for the replication may be striped so across each grid copy. The journal volumes may create a virtual striped space, each grid copy may get specific portions of the space, on which the grid copy may handle its journal. As well, the journal of each grid copy may manage its own list of snapshots.

Referring back to FIG. 5, the Virtual Consistency group 500 has a virtual journal 520. The virtual journal 520 may be made up of the journals 535, 545, 555, and 565 of the grid copies 530, 540, 550, and 560. Referring again to FIG. 5, each grid copy may maintain a journal which corresponds to a segment of the virtual journal.

Figure 12:
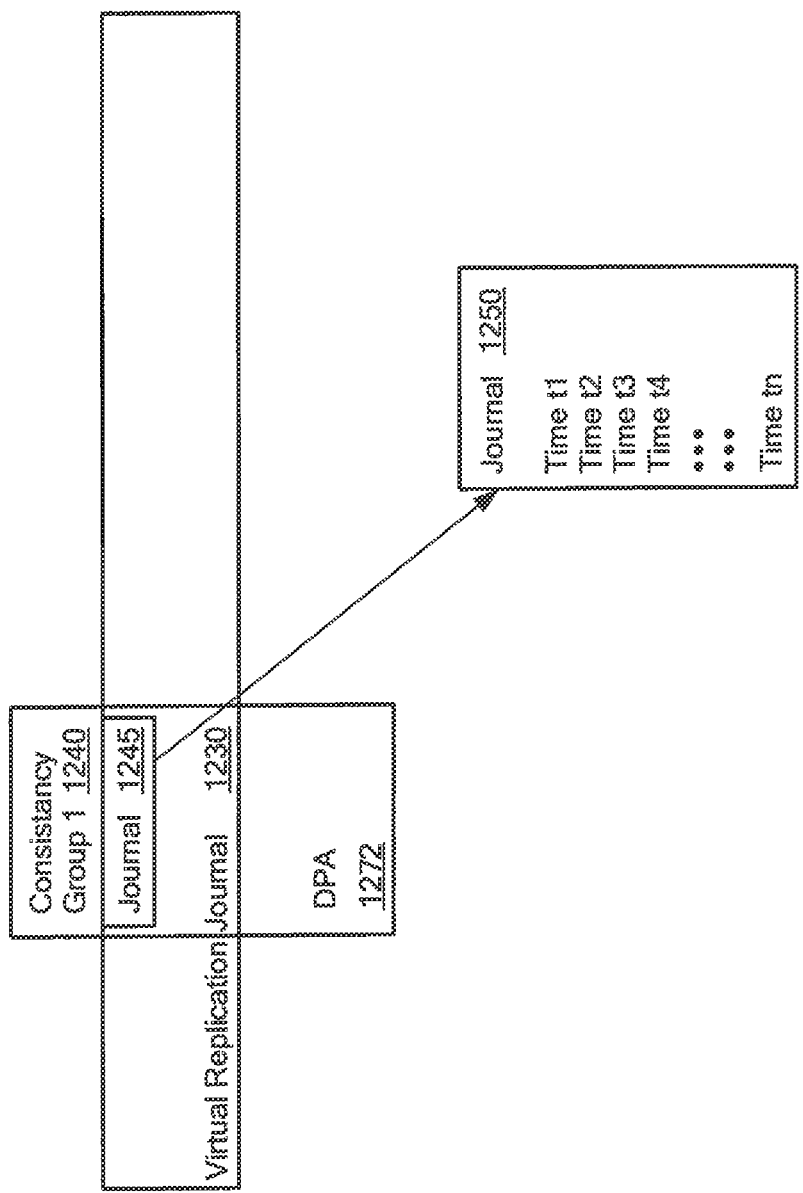
FIG. 12 is a block diagram of a time stamps on the journal of a grid copy.

Referring to FIG. 12, each journal, such as journal 1250, on a grid copy, such as grid copy 1240, may keep track of time increments for the journal. This allows each grid copy to roll the replication image forward and backward to reach a particular image. In some examples, when all grid copies of a virtual consistency group rolls the image back to a particular point in time Tz, the virtual consistency group may present the image of the replication for the virtual consistency group at time Tz. In some examples, the timestamps may be maintained within the journal do and undo streams.

Image Accessing

Figure 13A:
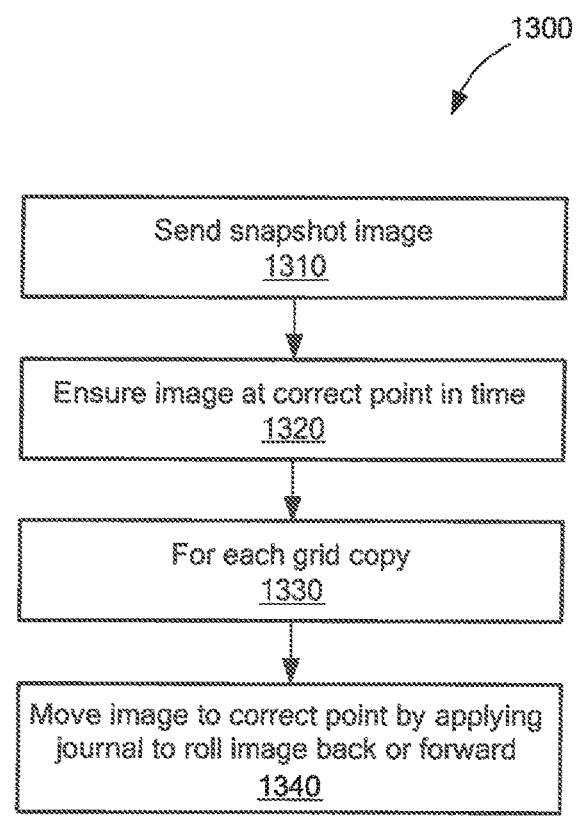
FIG. 13A is a flowchart of an example of a process to save and access a point in time snapshot.

In some examples, to access an image of the virtual consistency group, each grid copy may need to create an image the same point in time. Referring to FIG. 13A, for a process 1300, a snapshot message may be sent 1310 to all grid copies. Each grid copy may ensure 1320 that it is at the same correct point of time to create a consistent remote image. In some examples, accessing a point in time may require that each grid copy 1330 roll the image to the appropriate bookmark in the journal of the grid copy 1340.

After the image is created, user may access the volume in virtual or logged access mode Snapshot List The DPA may hold a list of n selected snapshots, where n=1000. As there may be many grid copies in the virtual CG, each grid copy may hold a different list of 1000 snapshots. The presented list of snapshots may be the intersection of the list of snapshots of all the grid copies. This may be because the list of 1000 snapshots is a selected list and it may be necessary to make sure the selection algorithm of each copy works the same. During a disaster, a message may arrive at one grid copy and not another. In this case, it may not be assumed that the lists are identical.

Figure 13B:
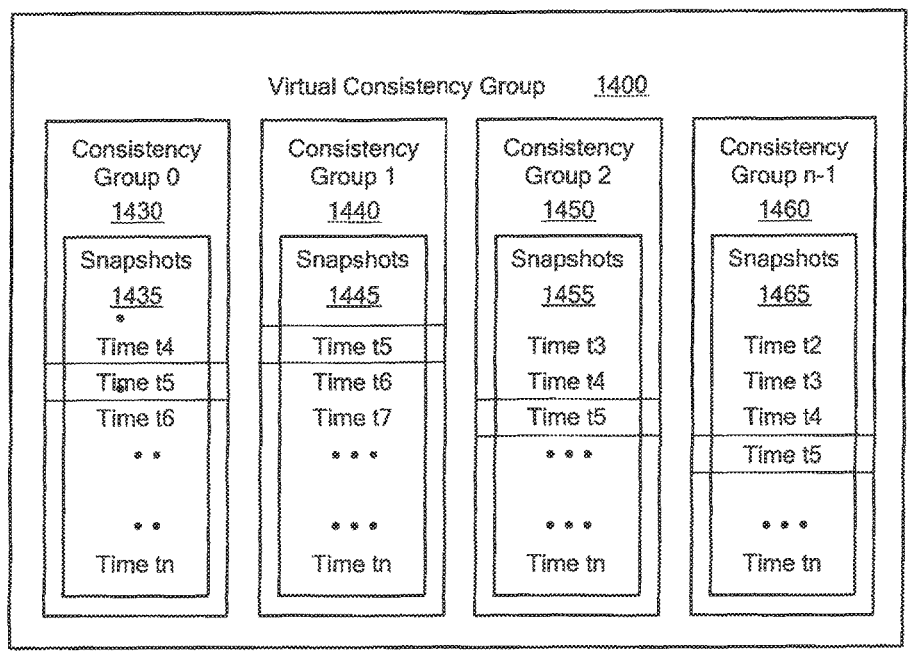
FIG. 13B is a block diagram of another example of time stamps across grid copies of a virtual consistency group.

Referring to FIG. 13B, the lists of the snapshots 835, 845, 855, 865, may not be identical and a smart selection algorithm exist may be applied. Each snapshot may get a snapshot ID, which may be an integer.

In some examples, the selection algorithm may keep the snapshot list with at most 1000 entries. When a new entry arrives, the selection algorithm may remove one entry from the list. The entry that may be removed may be the one with the lowest priority. In some examples, user bookmarks have the highest priority. In other examples, a system bookmark with odd bookmark IDs may have the lowest priority than snapshots with even ID not dividable by 4, than not dividable by 8; this type of deletion may maintain an equal distance between bookmarks. In some examples, if all the bookmarks have the same priority, selection may be made to ensure that the distance between bookmarks in terms of data is almost the same; that the delta between bookmarks is minimized. In other examples, it may be stated that the 10 bookmarks most recent bookmarks may not allowed to be diluted.

Figure 14:
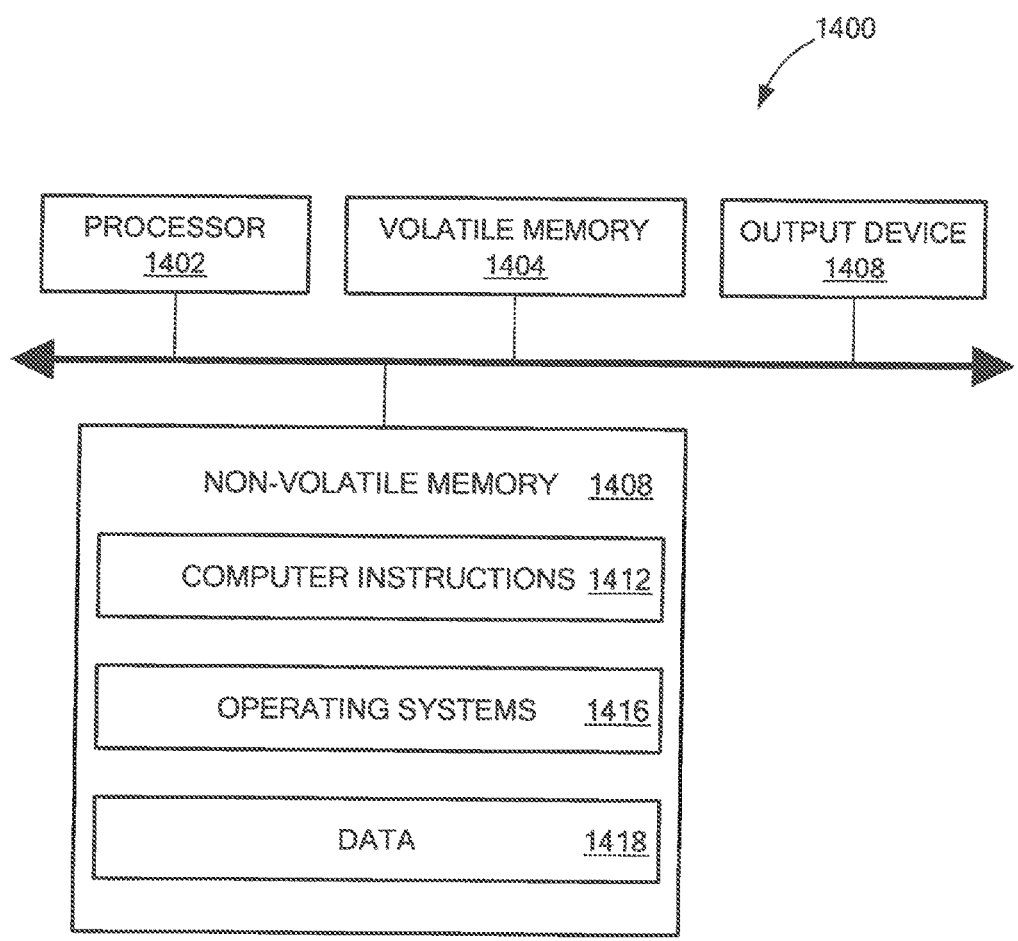
FIG. 14 is a computer on which any of the processes of FIGS. 9 to 11 may be implemented.

Referring to FIG. 14, a computer 1400 includes a processor 1402, a volatile memory 1404, a non-volatile memory 1406 (e.g., hard disk) and a user interface (UI) 1408 (e.g., a mouse, a keyboard, a display, touch screen and so forth). The non-volatile memory 1406 stores computer instructions 1412, an operating system 1416 and data 1418. In one example, the computer instructions 1412 are executed by the processor 1402 out of volatile memory 1404 to perform all or part of the processes described herein (e.g., processes 900, 1000 and 1100).

The processes described herein (e.g., processes 900, 1000 and 1100) are not limited to use with the hardware and software of FIG. 14; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a machine-readable storage device), for execution by, or to control the operation of; data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform the processes described herein. The processes described herein may also be implemented as a machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 900, 1000 and 1100 are not limited to the specific processing order of FIGS. 9 to 11 respectively. Rather, any of the processing blocks of FIGS. 9 to 11 may be re-ordered, combined or removed, performed in parallel or in serial, as necessary, to achieve the results set forth above.

The processing blocks (for example, in the processes 900, 1000 and 1100) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)).

Elements of different embodiments described herein may be combined to form other embodiments not specifically set forth above. Other embodiments not specifically described herein are also within the scope of the following claims.

What is claimed is:

1. A method, comprising: intercepting write I/Os going to a volume on a storage array; sending the write I/Os to targets on a plurality of source-side data protection appliances based on a load balancing scheme, each target stored on a respective one of the source-side data protection appliances; providing a virtual consistency group comprising source-side internal consistency groups, each source-side internal consistency group stored on a respective one of the plurality of source-side data protection appliances, each source-side internal consistency group handling a set of non-consecutive slices of the volume, and each source-side virtual consistency group being configured to: read metadata from a delta marker stream including delta markers for all source-side internal consistency groups, filter the stream to identify delta markers corresponding to the respective set of non-consecutive slices that is handled by the source-side virtual consistency group, and perform a data synchronization operation based on at least some of the identified delta markers; and replicating the write 1/0 from the source-side data protection appliance to a respective one of a plurality of target-side internal consistency groups based on a portion of the volume the write I/O is stored, each target-side internal consistency group stored on a respective one of a plurality of target-side data protection appliances, each target-side internal consistency group handling a respective portion of the volume.

2. The method of claim 1, further comprising:
providing a virtual consistency group comprising a grid copy on each of the source-side data protection appliances; and
replicating each write I/O from the source-side data protection appliance to one of a plurality of grid copies on a plurality of target-side data protection appliances based on what portion of the volume the write I/O is stored.

3. The method of claim 2, further comprising sending the write I/Os associated with the volume from the grid copies on the target-side data protection appliances to a target-side volume.

4. The method of claim 2, further comprising using the source-side data protection appliance to track metadata arriving to the volume at a delta marking stream.

5. The method of claim 1 wherein the load balancing scheme is a round robin.

6. The method of claim 1 wherein the load balancing scheme is performed by a multipath driver.

7. An article comprising: a non-transitory machine-readable medium that stores executable instructions, the instructions causing a machine to: intercept write I/Os going to a volume on a storage array; and send the write I/Os to targets on a plurality of source-side data protection appliances based on a load balancing scheme, each target stored on a respective one of the source-side data protection appliances; provide a virtual consistency group comprising source-side internal consistency groups, each source-side internal consistency group stored on a respective one of the plurality of source-side data protection appliances, each source-side internal consistency group handling a respective set of non-consecutive slices of the volume, and each source-side virtual consistency group being configured to: read metadata from a delta marker stream including delta markers for all source-side internal consistency groups, filter the stream to identify delta markers corresponding to the respective set of non-consecutive slices that is handled by the source-side virtual consistency group, and perform a data synchronization operation based on at least some of the identified delta markers; and replicate the write I/O from the source-side data protection appliance to a respective one of a plurality of target-side internal consistency groups based on a portion of the volume the write I/O is stored, each target-side internal consistency group stored on a respective one of a plurality of target-side data protection appliances, each target-side internal consistency group handling a respective portion of the volume.

8. The article of claim 7, further comprising instructions causing the machine to:
provide a virtual consistency group comprising a grid copy on each of the source-side data protection appliances;
replicate each write I/O from the source-side data protection appliance to one of a plurality of grid copies on a plurality of target-side data protection appliances based on what portion of the volume the write I/O is stored; and
send the write I/Os associated with the volume from the grid copies on the target-side data protection appliances to a target-side volume.

9. The article of claim 7 wherein the load balancing scheme is a round robin.

10. The article of claim 7 wherein the load balancing scheme is performed by a multipath driver.

11. An apparatus, comprising: circuitry configured to: intercept write I/Os going to a volume on a storage array; and send the write I/Os to targets on a plurality of source-side data protection appliances based on a load balancing scheme, each target stored on a respective one of the source-side data protection appliances; provide a virtual consistency group comprising source-side internal consistency groups, each source-side internal consistency group stored on a respective one of the plurality of source-side data protection appliances, each source-side internal consistency group handling a respective set of non-consecutive slices of the volume, and each source-side virtual consistency group being configured to: read metadata from a delta marker stream including delta markers for all source-side internal consistency groups, filter the stream to identify delta markers corresponding to the respective set of non-consecutive slices that is handled by the source-side virtual consistency group, and perform a data synchronization operation based on at least some of the identified delta markers; and replicate the write I/O from the source-side data protection appliance to a respective one of a plurality of target-side internal consistency groups based on a portion of the volume the write I/O is stored, each target-side internal consistency group stored on a respective one of a plurality of target-side data protection appliances, each target-side internal consistency group handling a respective portion of the volume.

12. The apparatus of claim 11 wherein the circuitry comprises at least one of a processor, a memory, programmable logic or logic gates.

13. The apparatus of claim 11, further comprising circuitry configured to:
provide a virtual consistency group comprising a grid copy on each of the source-side data protection appliances;
replicate each write I/O from the source-side data protection appliance to one of a plurality of grid copies on a plurality of target-side data protection appliances based on what portion of the volume the write I/O is stored; and send the write I/Os associated with the volume from the grid copies on the target-side data protection appliances to a target-side volume.

14. The apparatus of claim 11 wherein the load balancing scheme is a round robin.

15. The apparatus of claim 11 wherein the load balancing scheme is performed by a multipath driver.

* * * * *